US011282159B2

(12) United States Patent
Kurahashi

(10) Patent No.: US 11,282,159 B2
(45) Date of Patent: Mar. 22, 2022

(54) IMAGE DISPLAY SYSTEM THAT EXECUTES RENDERING BY SWITCHING THE RENDERING BETWEEN RENDERING BY A SERVER AND RENDERING BY A CLIENT TERMINAL

(71) Applicant: KONICA MINOLTA, INC., Chiyoda-ku (JP)

(72) Inventor: Akira Kurahashi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/506,757

(22) Filed: Jul. 9, 2019

(65) Prior Publication Data

US 2019/0333184 A1  Oct. 31, 2019

Related U.S. Application Data

(63) Continuation of application No. 15/878,104, filed on Jan. 23, 2018, now abandoned.

(30) Foreign Application Priority Data

Jan. 23, 2017 (JP) .............................. JP2017-009407

(51) Int. Cl.
*G06T 1/20* (2006.01)
*G06F 3/14* (2006.01)
*G09G 3/20* (2006.01)

(52) U.S. Cl.
CPC .................. *G06T 1/20* (2013.01); *G06F 3/14* (2013.01); *G06F 3/1454* (2013.01);
(Continued)

(58) Field of Classification Search
CPC ........ G06F 3/14; G06F 3/1438; G06F 3/1354; G06T 1/20; G06T 2200/28;
(Continued)

(56) References Cited

U.S. PATENT DOCUMENTS 8,410,994 B1 * 4/2013 Testa ...................... H04L 67/42
345/1.3
8,539,025 B2 * 9/2013 Husain .............. H04L 29/08927
709/203
(Continued)

FOREIGN PATENT DOCUMENTS

| JP | 2004-252005 | 9/2004 |
| JP | 2014-102835 | 6/2014 |
| JP | 2015-534160 | 11/2015 |

OTHER PUBLICATIONS

Office Action dated Feb. 5, 2020 issued in Japanese Patent Application No. 2017-009407.
(Continued)

*Primary Examiner* — Jacinta M Crawford
(74) *Attorney, Agent, or Firm* — Cozen O'Connor

(57) ABSTRACT

An image display system, including: a server and a client terminal, wherein the server includes a server-side hardware processor which performs rendering to generate an initial display image, transmits the initial display image and the image data to the client terminal, at least when rendering is performed to a plurality of pieces of image data, the server executes rendering and transmission of image data so that at least parts of execution periods overlap, the server-side hardware processor executes rendering until end of the transmission, the client terminal is a zero client terminal and includes a client-side hardware processor which displays the received initial display image, and performs rendering of the received image data to generate and display a client display image, and the client terminal executes rendering by switching from the server-side hardware processor to the client-side hardware processor based on end of the transmission.

13 Claims, 2 Drawing Sheets

(52) U.S. Cl.
CPC ...... *G06T 2200/28* (2013.01); *G06T 2210/41* (2013.01); *G09G 3/2096* (2013.01); *G09G 2340/02* (2013.01); *G09G 2360/10* (2013.01); *G09G 2370/022* (2013.01); *G09G 2370/025* (2013.01); *G09G 2380/08* (2013.01)

(58) Field of Classification Search
CPC .. G06T 2210/41; G09G 3/2096; G09G 5/363; G09G 2340/02; G09G 2360/10; G09G 2370/022; G09G 2370/025; G09G 2380/08
USPC ......................................................... 345/502
See application file for complete search history.

(56) References Cited

U.S. PATENT DOCUMENTS

| | | | |
|---|---|---|---|
| 8,754,900 B2* | 6/2014 | Koneru | H04N 19/12 345/537 |
| 9,307,234 B1* | 4/2016 | Greiner | H04N 19/156 |
| 2002/0025084 A1* | 2/2002 | Yang | H04N 1/3875 382/299 |
| 2007/0115282 A1 | 5/2007 | Turner et al. | |
| 2012/0092351 A1* | 4/2012 | Barnes | G09G 5/363 345/505 |
| 2012/0249567 A1* | 10/2012 | Bocirnea | G06F 3/14 345/581 |
| 2013/0147819 A1 | 6/2013 | Dharmapurikar | |
| 2014/0074913 A1 | 3/2014 | Claydon | |
| 2014/0253563 A1 | 9/2014 | Koneru | |

OTHER PUBLICATIONS

Office Action dated Nov. 2, 2021 issued in Japanese Patent Application No. 2020-204738.

* cited by examiner

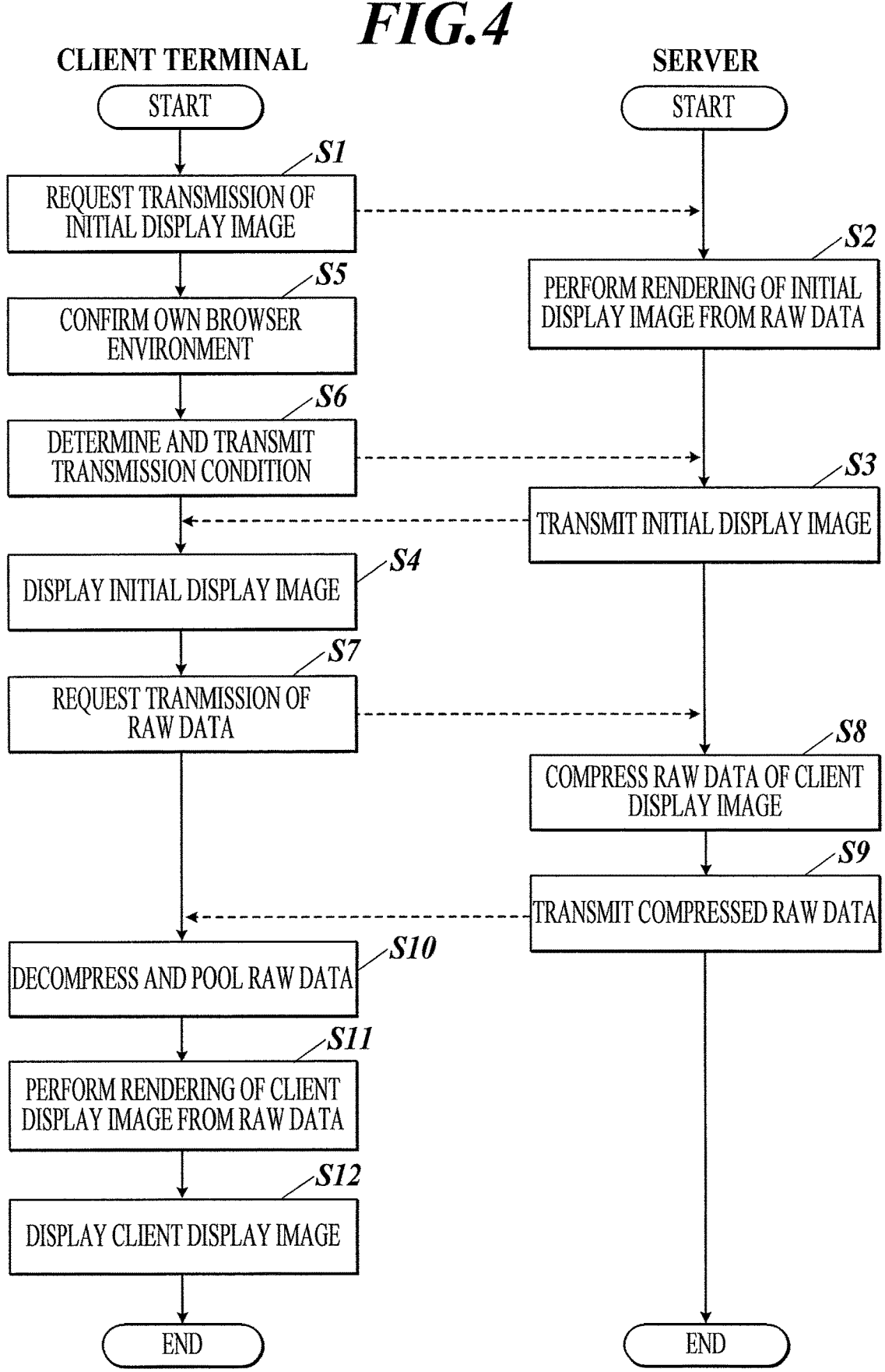

IMAGE DISPLAY SYSTEM THAT EXECUTES RENDERING BY SWITCHING THE RENDERING BETWEEN RENDERING BY A SERVER AND RENDERING BY A CLIENT TERMINAL

RELATED APPLICATIONS

This application is a Continuation of U.S. patent application Ser. No. 15/878,104 filed Jan. 23, 2018 which claims priority of Japanese Application No. 2017-009407 filed Jan. 23, 2017, the disclosure contents of which are hereby incorporated by reference.

BACKGROUND

1. Technological Field

The present invention relates to an image display system which includes a server that stores image data and a client terminal that is connected to the server and displays an image based on the image data.

2. Description of the Related Art

There has been conventionally known an image display system which includes a server that is connected to an imaging apparatus such as a CR (Computed Radiography), a CT (Computed Tomography) and an MRI (Magnetic Resonance Imaging), and stores and manages image data of medical images obtained by imaging using these apparatuses, and a client terminal that is connected to the server via a network and is capable of displaying the medical images based on the image data as needed.

In order to view the medical images based on the medical image data which is stored in the server on the client terminal, rendering needs to be performed by the server or the client terminal. Formerly, the rendering has been performed by any of the server and the client terminal. However, in recent years, there has been proposed an image display system which executes rendering by switching between the rendering by the server and the rendering by the client terminal as needed (see Japanese Patent Application Laid-Open Publication No. 2015-534160).

However, in the above-mentioned image display system which executes rendering by switching between the rendering by the server and the rendering by the client terminal as needed, the client terminal is required to have an appropriate processing capacity. Thus, there has been a problem that an expensive device such as a PC needs to be used for the client terminal and the introduction cost of the system is high.

There has been also a problem that security measures and various types of maintenance are continuously required for individual client terminals as well as the server and thus the maintenance and the management are troublesome.

SUMMARY

The present invention has been made in consideration of the above problems, and an object of the present invention is to enable introduction of an image display system at a low cost and achieve easy maintenance and management of the image display system after the introduction, the image display system executing rendering so as to switch the rendering between rendering by a server and rendering by a client terminal.

To achieve at least one of the abovementioned objects, according to an aspect of the present invention, an image display system reflecting one aspect of the present invention includes a server which stores a single or a plurality of pieces of image data; and a client terminal which is connected to the server via a network and has a display that displays an image based on the single or the plurality of pieces of image data, wherein the server includes a server-side hardware processor which performs rendering of the image data to generate a single or a plurality of initial display images, transmits the single or the plurality of initial display images to the client terminal and transmits the single or the plurality of pieces of image data to the client terminal, at least when the rendering is performed to the plurality of pieces of image data to generate the plurality of initial display images, the server executes the rendering of the plurality of pieces of image data and transmission of the plurality of pieces of image data so that at least parts of execution periods of the rendering and the transmission overlap each other, the server-side hardware processor executes the rendering of the single or the plurality of pieces of image data during a period until the server-side hardware processor finishes the transmission of the image data, the client terminal is a zero client terminal, the client terminal includes a client-side hardware processor which displays the initial display image or the initial display images received from the server on the display, and performs the rendering of the single or the plurality of pieces of image data received from the server to generate a client display image and displays the generated client display image on the display, and the client terminal executes the rendering of the single or the plurality of pieces of image data by switching the rendering from the server-side hardware processor to the client-side hardware processor based on end of the transmission of the single or the plurality of pieces of image data by the server-side hardware processor.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 4 is a ladder chart showing image display processing in the embodiment.

DETAILED DESCRIPTION OF EMBODIMENTS

First Embodiment

Hereinafter, a first embodiment of the present invention will be described in detail with reference to the drawings. However, the scope of the invention is not limited to the disclosed embodiments or illustrated examples.

[Configuration of Image Display System]

First, the configuration of an image display system 1 in an embodiment will be described.

Figure 1:
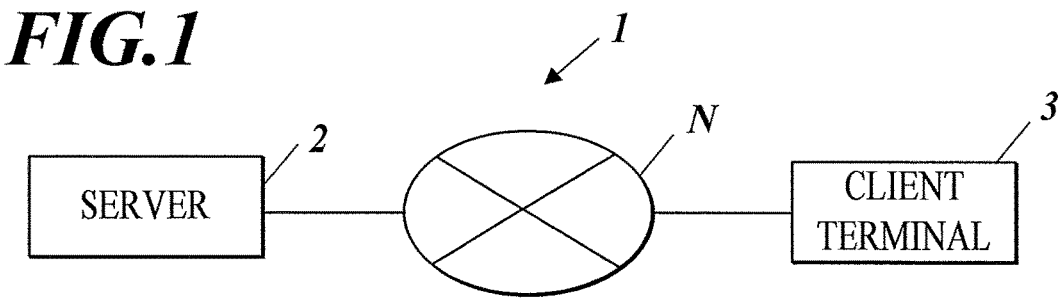
FIG. 1 is a schematic configuration view of an image display system in an embodiment of the present invention.

FIG. 1 is a schematic configuration view of the image display system 1 in the embodiment.

As shown in FIG. 1, the image display system 1 in the embodiment is configured by including a server 2 and a client terminal 3.

The server 2 is included in a medical image management system (Picture Archiving and Communication System: PACS). The server 2 is connected to a modality not shown in the drawings (for example, a CR (Computed Radiography), a CT (Computed Tomography), an MRI (Magnetic Resonance Imaging) or the like), and can receive, from the modality, image data of a medical image which was obtained by imaging of a patient with the modality. The server 2 can store the received image data and manage the image data for each patient.

The details of the server 2 will be described later.

The client terminal 3 is for displaying the medical image, and used by a user such as a doctor, a nurse and a home care worker at a facility such as a hospital, a clinic, a home care facility and a home of a patient under home care. The client terminal 3 is connected to the server 2 via a communication network N, and the client terminal 3 and the server 2 can communicate with each other. Though FIG. 1 shows the image display system 1 in which only a single client terminal 3 is connected, a plurality of client terminals 3 may be connected in the image display system 1.

The details of the client terminal 3 will be described later.

[Configuration of Server]

Next, the details of the server 2 will be described.

Figure 2:
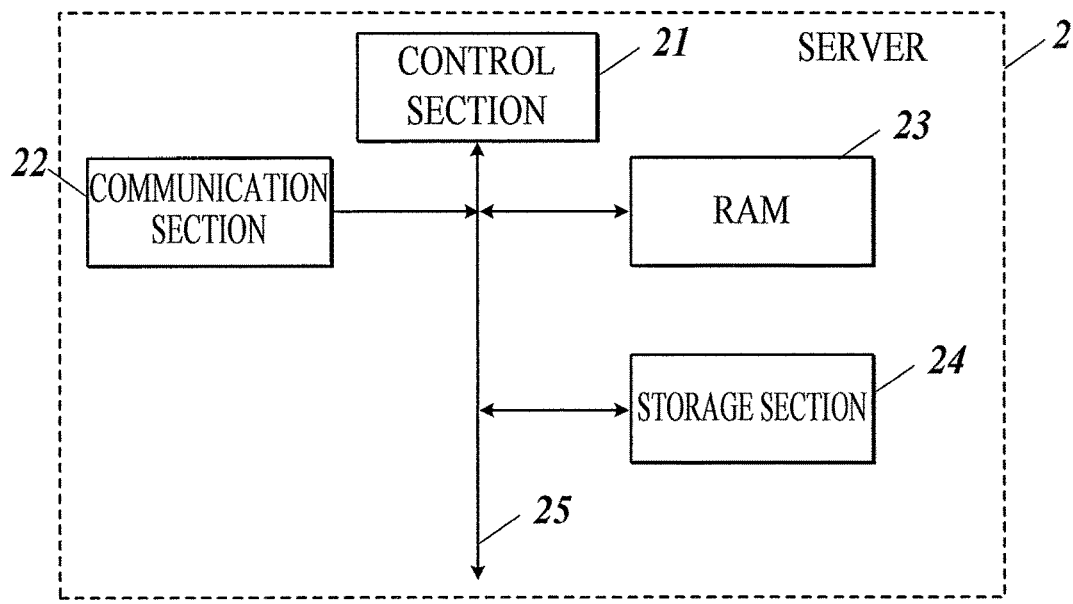
FIG. 2 is a block diagram showing a functional configuration example of a server included in the image display system of FIG. 1.

FIG. 2 is a block diagram showing an example of the functional configuration of the server 2.

As shown in FIG. 2, the server 2 is configured by including a control section 21, a communication section 22, a RAM 23, a storage section 24 and such like, and the sections 21 to 24 are connected to each other via a bus 25.

The server 2 may be a cloud server provided in a cloud environment.

The sever 2 may be provided with a display section and an operation section not shown in the drawings so as to configure an image management apparatus which can perform display of medical images and various types of image processing around the server 2.

The control section 21 is configured by including a CPU (Central Processing Unit) and such like, and integrally controls the processing operations of the sections in the server 2. Specifically, according to various signals (for example, a transmission request signal of an image or data and such like) from the client terminal 3 which are received by the communication section 22, the CPU reads out various processing programs stored in the storage section 24 and loads the programs into the RAM 23, and performs various types of processing in cooperation with the programs.

The communication section 22 is configured by including a network interface or the like, and performs data transmission/reception with external equipment which is connected via a communication network N such as LAN (Local Area Network), WAN (Wide Area Network) and the internet.

The RAM 23 forms a working area for temporarily storing various programs which were read from the storage section 24, input or output data, parameters and such like in various types of processing which are executed and controlled by the control section 21.

The storage section 24 is configured by including an HDD (Hard Disk Drive), a semiconductor nonvolatile memory and such like, and stores various processing programs and parameters, files and such like which are necessary for executing the programs. Specifically, the storage section 24 stores a webserver program for executing a function as a webserver which provides various web screens to a web browser, a web application program for operating on the webserver and providing a medical image to a user of the client terminal 3 via the web browser, and such like.

The storage section 24 has a database for managing raw data (image data) of a medical image which was transmitted from the modality not shown in the drawings. Predetermined accompanying information such as a patient name, an examination type and date is attached to the raw data to enable identification of each raw data, for example.

The raw data which is treated by the image display system 1 in the embodiment includes raw data that is formed of a single piece of image data for a single image and raw data that is formed of a plurality of pieces of image data for a dynamic image (a plurality of images which are seen as a series of moving image by being displayed continuously).

The server 2 configured in such a way operates as in the following manner by software processing in cooperation between the control section 21 and a program stored in the storage section 24.

For example, the control section 21 has a function of rendering raw data of a medical image which is stored in the storage section 24 to generate an initial display image and transmitting the generated initial display image to the client terminal 3. The initial display image means an image which was obtained by converting the raw data obtained by photography with the modality into a format with a small data amount in order to enable rapid transmission and view.

The control section 21 also has a function of compressing the raw data of the medical image on the basis of an image transmission condition which was received from the client terminal 3 and transmitting the raw data which is compressed or not processed to the client terminal 3 in a background process. A preferable compression format of data is lossless compression such as ZIP and JPEG 2000 in which the original data completely matches the data after the compression/decompression.

It is preferable that the transmission of raw data and the rendering of raw data are executed in parallel with each other from a viewpoint of shortening the time until the image is displayed on the client terminal 3. However, in a case where the raw data is formed of a single piece of data, the execution periods of respective processing are not especially defined, and at least parts of the execution periods may overlap each other or the transmission of raw data may be executed after the rendering of raw data was executed.

On the other hand, in a case where the raw data is formed of a plurality of pieces of data, the execution periods are not especially defined as long as at least parts of the execution periods overlap each other. For example, after rendering was executed for the first piece of data among the plurality of pieces of data included in the raw data, transmission of the first piece of data may be executed when rendering is performed for the pieces of data following the first piece of data.

[Configuration of Client Terminal]

Next, the details of the client terminal 3 will be described.

Figure 3:
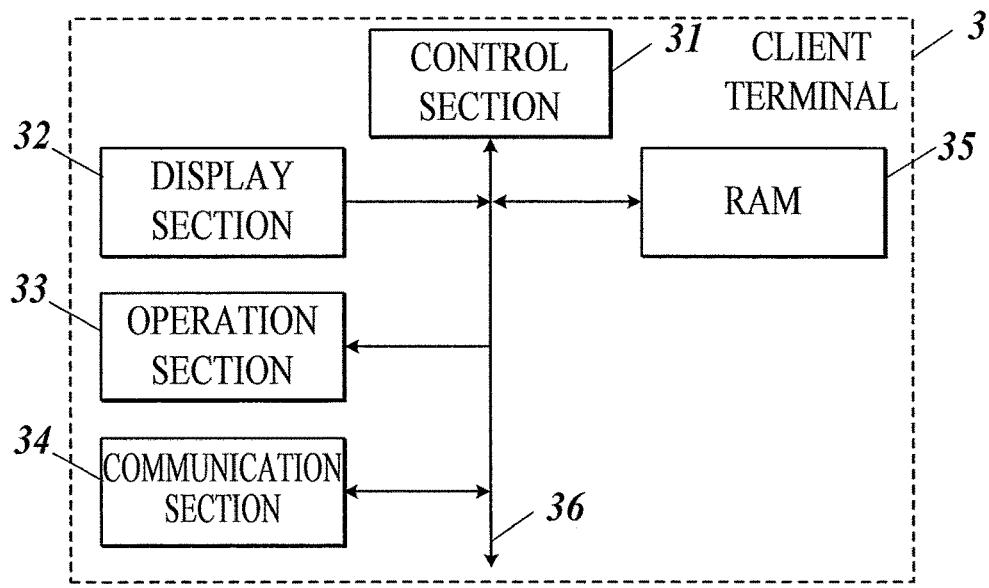
FIG. 3 is a block diagram showing a functional configuration example of a client terminal included in the image display system of FIG. 1.

FIG. 3 is a block diagram showing an example of the functional configuration of the client terminal 3.

As shown in FIG. 3, the client terminal 3 is configured by including a control section 31, a display section 32, an operation section 33, a communication section 34, a RAM 35 and such like, and the sections 31 to 35 are connected to each other via a bus 36.

In the embodiment, a zero client terminal is used as the client terminal 3. The zero client indicates a client which uses a terminal that does not include an OS or a local storage and does not leave any data (trace) on the client terminal in an application which is delivered from a server to a client. As a general means for achieving the zero client, there is an application which is achieved on a browser by HTML5+ JavaScript (registered trademark).

It is preferable that a mobile terminal which can be carried is used as the client terminal 3.

The control section 31 is configured by including a CPU for the zero client and such like, and integrally controls the processing operations of the sections in the client terminal 3. Specifically, according to operation signals which were input from the operation section 33, the control section 31 reads out and executes web application programs which are stored in the storage section 24 of the server 2, and thereby transmits various display signals to the display section 32.

The display section 32 is configured by including a monitor such as an LCD, and displays various screens in accordance with instructions of display signals which were input from the control section 31. The display section 32 displays, for example, a list of raw data of medical images stored in the server 2 and a medical image based on the selected raw data (initial display image, client display image) on the basis of display data of various web screens received from the server 2.

The operation section 33 is configured by including a keyboard which includes various keys and a pointing device such as a mouse or a touch panel which is layered on the display section 32. The operation section 33 outputs an operation signal which was input according to a key operation to the keyboard, a mouse operation or the position of a touch operation to the touch panel to the control section 31.

The communication section 34 is configured by including a network interface or the like, and performs data transmission/reception with external equipment which is connected via a communication network N such as LAN, WAN and the internet. The communication section 34 may perform wireless communication by using a mobile phone line or the like to perform data transmission/reception with external equipment which is connected via a communication network N.

The client terminal 3 which is configured in such a way performs the following operation by the processing in the control section 31.

For example, the control section 31 of the client terminal 3 has a function of displaying the initial display image which was received from the server 2 on the display section 32.

The control section 31 has a function of pooling the received raw data in a memory of a browser.

The client terminal 3 has a function of generating a client display image by rendering the pooled raw data and displaying the generated client display image on the display section 32.

[Operation in Image Display System]

Next, the operation of the image display system 1 will be described.

FIG. 4 is a ladder chart showing image display processing which is executed in the image display system 1 when a medical image is displayed on the client terminal 3.

First, when the user inputs an instruction to display a predetermined medical image on the display section 32 via the operation section 33 of the client terminal 3, the client terminal 3 transmits, to the server 2, a transmission request signal of an initial display image corresponding to the input instruction (step S1).

The "instruction to display a medical image" specifically means that the user specifies a desired patient name and/or examination type from a list screen which is displayed on the display section 32 and displays a list of patient names, examination types and such like. Thus, one raw data is specified from among the plurality of raw data which is stored in the storage section 24 in the server 2.

When the server 2 receives the transmission request signal of the initial display image from the client terminal 3, the server 2 reads out the corresponding raw data from the storage section 24, performs rendering of the raw data and generates an initial display image (step S2).

When the rendering is finished, the server 2 transmits the initial display image to the client terminal 3 (step S3).

When the client terminal 3 receives the initial display image from the server 2, the client terminal 3 displays the received image on the display section 32 (step S4). As described above, since the initial display image has the data amount smaller than the data amount of the original raw data and can be transmitted faster than the raw data, initial display on the client terminal 3 can be performed rapidly.

When the client terminal 3 displays the initial display image, the client terminal 3 transmits a transmission request signal of raw data to the server 2 (step S7).

The client terminal 3 confirms its own browser environment during a period from the processing of step S1 to the processing of step S4 (step S5), and determines a transmission condition of the raw data and a pooling condition in the client terminal 3 on the basis of the confirmed contents (step S6).

Specifically, the capacity of a memory which is usable on a browser, the processing speed of the CPU of the control section 31, the communication speed of the network N and such like are confirmed as the browser environment, for example.

The transmission condition is, for example, whether to compress the raw data, the compression format in a case of performing the compression, the transmission speed from the server 2 to the client terminal 3, and such like.

For example, in a case where the image processing capacity of the client terminal 3 is determined to be relatively high, it is determined to perform compression of the raw data. In a case where the image processing capacity of the client terminal 3 is low but the communication speed of the communication network N is high, it is determined to transmit the raw data without performing compression. In such a way, since the raw data is transmitted in consideration of the browser environment, the zero client can be adopted.

The determined transmission condition may be transmitted to the server 2 as soon as the transmission condition is determined, or may be transmitted together with the transmission request of the raw data.

Here, though the processing in steps S5 and S6 are performed on the client terminal 3, these processing may be performed by the server 2.

When the server 2 receives the transmission request signal of the raw data, the server 2 confirms the transmission condition and the pooling condition which were received from the client terminal 3, and performs compression of the raw data as needed (step S8). The raw data is transmitted to the client terminal 3 in a background process (step S9). Thus, the raw data is transmitted in parallel with the initial display on the client terminal 3. Thus, it is possible to shorten the time from the initial display to the completion of transmission of the raw data.

For the raw data in the middle of transmission (transmission is not completed), the server 2 performs rendering.

While the raw data is received, the client terminal 3 performs display notifying the user of the degree of progress of the data reception or the completion of the data reception as in a progress bar on the display section 32, for example.

The client terminal 3 sequentially decompresses the raw data in a case where the raw data transmitted from the server 2 is compressed, and the client terminal 3 pools the data in the memory (step S10). When the reception and decompression of the raw data are completed, the client terminal 3 performs rendering of the raw data and generates the client display image (step S11). At this time, the rendering which has been performed by the server 2 is stopped. By doing this, the load on the server 2 can be reduced.

When the rendering of the raw data is finished, the generated client display image is displayed on the display section 32. After end of transmission of the raw data which is the original of the client display image to the client terminal 3, the client terminal 3 can perform image processing such as enlargement, reduction and processing regarding gradation, for example, without sending back the data to the server 2 each time.

As described above, in the image display system 1 in the embodiment, the zero client is used for the client terminal 3. Since the zero client does not include a CPU and a local storage nor mounts OS, the zero client can be introduced at a low cost. In addition, the high security can be maintained and the maintenance can also be made easily.

In the image display system 1, the initial display image for which rendering was performed on the server 2 is first displayed rapidly, and thereafter, there is displayed the client display image obtained by rendering the raw data on the client terminal 3. Thus, it is possible to prevent the situation that the image cannot be viewed for a long time after the instruction of display of the image on the client terminal 3.

Compared with a case of using a PC or the like as the client terminal, in some cases, the zero client is limited in the memory which can be used. However, in the image display system 1, the server 2 or the client terminal 3 confirms the browser environment of the client terminal 3, and the server 2 determines the transmission condition of image data to the client terminal 3 and the pooling condition of image data in the client terminal 3 on the basis of the confirmation result. Thus, raw data can be transmitted even to the client terminal 3 having a limitation.

Second Embodiment

Next, a second embodiment of the present invention will be described. Explanation is omitted for the same configurations and operations as those in the first embodiment.

In the image display system 1 in the first embodiment, rendering of raw data is executed by being automatically switched from the server 2 to the client terminal 3 on the basis of end of transmission of the raw data from the server 2 to the client terminal 3, whereas, in the image display system 1 in the embodiment, the switching is performed manually. Thus, the server 2 and the client terminal 3 in the embodiment are different from those in the first embodiment in a part of the functions.

Specifically, the client terminal 3 in the embodiment can select which of the server 2 and the client terminal 3 performs the rendering of raw data after the completion of the reception of the raw data on the basis of the operation to the operation section 33, and can transmit the selection result to the server 2. The timing to perform the selection is arbitrary.

Thus, the client terminal 3 executes rendering of the received raw data only when the rendering by the client terminal is selected.

On the other hand, when the selection result received from the client terminal 3 is rendering by the server 2, rendering on the server 2 is continuously executed, and when the selection result is rendering by the client terminal 3, the server 2 ends the rendering which has been performed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image display system, comprising:
a server which stores a single piece of image data or a plurality of pieces of image data; and a client terminal which is connected to the server via a network and has a display that displays an image based on the single piece of image data or the plurality of pieces of image data, wherein
the server includes a server-side hardware processor which performs rendering of the single piece of image data or the plurality of pieces of image data to generate a single of initial display image or a plurality of initial display images, transmits the single of initial display image or the plurality of initial display images to the client terminal and transmits the single piece of image data or the plurality of pieces of image data to the client terminal,
at least when the rendering is performed to the single piece of image data or the plurality of pieces of image data to generate the single of initial display image or the plurality of initial display images, the server executes transmission of the single piece of image data or the plurality of pieces of image data,
the client terminal includes a client-side hardware processor which displays the single of initial display image or the plurality of initial display images received from the server on the display, performs rendering of the single piece of image data or the plurality of pieces of image data received from the server to generate a client display image or a plurality of client display images, and then displays the client display image or the plurality of client display images on the display,
a data amount of the single of the initial display image is lower than a data amount of the client display image, and a data amount of the plurality of initial display images is lower than a data amount of the plurality of client display images.

2. The image display system according to claim 1, wherein the server executes the rendering of the single piece of image data or the plurality of pieces of image data and the transmission of the single piece of image data or the plurality of pieces of image data so that at least parts of execution periods of the rendering and the transmission overlap each other.

3. The image display system according to claim 1, wherein the client terminal displays the single of initial display image or the plurality of initial display images during performing the rendering of the single piece of image data or the plurality of pieces of image data by the client-side hardware processor.

4. The image display system according to claim 1, wherein the server-side hardware processor executes the rendering of the single piece of image data or the plurality of pieces of image data during a period until the server-side hardware processor finishes the transmission.

5. The image display system according to claim 1, wherein the client terminal executes the rendering of the single piece of image data or the plurality of pieces of image data by switching the rendering from the server-side hardware processor to the client-side hardware processor after the transmission by the server-side hardware processor.

6. The image display system according to claim 5, wherein the client terminal automatically switches the rendering of the single piece of image data or the plurality of pieces of image data from the server-side hardware processor to the client-side hardware processor based on the end of the transmission of the single piece of image data or the plurality of pieces of image data by the server-side hardware processor.

7. The image display system according to claim 5, wherein the client-side hardware processor selects switching between the client-side hardware processor and the server-side hardware processor according to user's operation based on the end of the transmission of the single piece of image data or the plurality of pieces of image data by the server-side hardware processor.

8. The image display system according to claim 1, wherein the client terminal is a zero client terminal.

9. The image display system according to claim 1, wherein the client terminal receives the single piece of image data or the plurality of pieces of image data in a background process.

10. The image display system according to claim 1, wherein
the client-side hardware processor confirms a browser environment of the client terminal, determines a transmission condition of the single piece of image data or the plurality of pieces of image data from the server to the client terminal based on a confirmation result and transmits a determination result to the server, and
the server-side hardware processor transmits the single piece of image data or the plurality of pieces of image data in a manner corresponding to the determination result which is received from the client-side hardware processor.

11. The image display system according to claim 1, wherein
the server-side hardware processor compresses the single piece of image data or the plurality of pieces of image data before the transmission of the single piece of image data or the plurality of pieces of image data according to a determination result which is received from the client-side hardware processor, and
the client-side hardware processor decompresses the compressed single piece of image data or the plurality of pieces of image data when the image data is received.

12. The image display system according to claim 1, wherein the client-side hardware processor notifies a reception state of the single piece of image data or the plurality of pieces of image data from the server.

13. The image display system according to claim 1, wherein the server renders the image data to be a displayable image as the initial display image on the server.

* * * * *